US012162793B2

(12) United States Patent
Roh et al.

(10) Patent No.: US 12,162,793 B2
(45) Date of Patent: Dec. 10, 2024

(54) WINDOW MANUFACTURING METHOD AND WINDOW MANUFACTURING APPARATUS

(71) Applicant: Samsung Display Co., Ltd., Yongin-si (KR)

(72) Inventors: Cheollae Roh, Seongnam-si (KR); Voronov Alexander, Suwon-si (KR); Hyungsik Kim, Suwon-si (KR); Emil Aslanov, Asan-si (KR); Sunggyu Park, Hwaseong-si (KR); Joongsung Lee, Hwaseong-si (KR); Woohyun Jung, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 501 days.

(21) Appl. No.: 17/577,846

(22) Filed: Jan. 18, 2022

(65) Prior Publication Data
US 2022/0315481 A1 Oct. 6, 2022

(30) Foreign Application Priority Data

Apr. 1, 2021 (KR) .................. 10-2021-0042923

(51) Int. Cl.
*C03B 33/02* (2006.01)
*C03C 15/00* (2006.01)

(52) U.S. Cl.
CPC .......... *C03C 15/00* (2013.01); *C03B 33/0222* (2013.01)

(58) Field of Classification Search
CPC .................................................. C03B 33/0222
See application file for complete search history.

(56) References Cited

U.S. PATENT DOCUMENTS 9,346,706 B2 5/2016 Bazemore et al.
9,850,160 B2 12/2017 Marjanovic et al.
(Continued)

FOREIGN PATENT DOCUMENTS

CN 102730956 8/2015
JP 2013-31880 2/2013
(Continued)

OTHER PUBLICATIONS

Jin Huang et al., "Influence of bulk defects on bulk damage performance of fused silica optics at 355 nm nanosecond pulse laser", Optics Express, Dec. 25, 2017, pp. 33416-33428, vol. 25, No. 26.

(Continued)

*Primary Examiner* — Cynthia Szewczyk
(74) *Attorney, Agent, or Firm* — KILE PARK REED & HOUTTEMAN PLLC

(57) ABSTRACT

A window manufacturing method includes providing a mother substrate on a moving stage, the mother substrate including a cutting line; irradiating substantially simultaneously a first beam and a second beam to the mother substrate to cut the mother substrate and to form a target substrate; separating the target substrate from the mother substrate; and providing an etchant to the target substrate to chamfer the target substrate. The first beam is irradiated to the cutting line of the mother substrate, the second beam is irradiated to a point spaced apart from the cutting line of the mother substrate by a distance, and a pulse energy of the first beam is different from a pulse energy of the second beam.

20 Claims, 21 Drawing Sheets

(56) References Cited

U.S. PATENT DOCUMENTS

| | | | | |
|---|---|---|---|---|
| 2002/0060210 A1* | 5/2002 | Terada | ................... | B23K 26/38 |
| | | | | 219/121.76 |
| 2014/0138420 A1* | 5/2014 | Peng | ....................... | C03B 33/07 |
| | | | | 225/2 |
| 2015/0165548 A1 | 6/2015 | Marjanovic et al. | | |
| 2016/0280580 A1* | 9/2016 | Bohme | ................. | C03B 33/091 |
| 2019/0283178 A1 | 9/2019 | Mishchik et al. | | |
| 2020/0147729 A1 | 5/2020 | Chang et al. | | |

FOREIGN PATENT DOCUMENTS

| | | |
|---|---|---|
| KR | 10-0631304 | 10/2006 |
| KR | 10-1931322 | 12/2018 |

OTHER PUBLICATIONS

Jianqiang Liu et al., "In Situ Monitoring and Universal Modelling of Sacrificial PSG Etching Using Hydrofluoric Acid", Proceedings of IEEE Conference on Micro Electro Mechanical Systems, 1993, pp. 71-76.

\* cited by examiner

WINDOW MANUFACTURING METHOD AND WINDOW MANUFACTURING APPARATUS

CROSS-REFERENCE TO RELATED APPLICATION(S)

This application claims priority to and benefits of Korean Patent Application No. 10-2021-0042923 under 35 U.S.C. § 119, filed on Apr. 1, 2021 in the Korean Intellectual Property Office, the entire contents of which are incorporated herein by reference.

BACKGROUND

1. Technical Field

The disclosure relates to a window manufacturing method and a window manufacturing apparatus. The disclosure relates to a window manufacturing method and a window manufacturing apparatus for a window used for a display device.

2. Description of the Related Art

A display device that provides images to a user is applied to various multimedia devices, such as a television set, a mobile phone, a tablet computer, a gate unit, etc. The display device may include modules to display the images and a window to protect the modules. The window included in the display device is designed to have a thin thickness to reduce the weight of the display device and to improve user convenience.

A method of manufacturing the window may include cutting a substrate and chamfering the cut substrate. However, as a thickness of the substrate decreases and a size of the substrate increases, it may be difficult to precisely cut and chamfer the substrate.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a window manufacturing method capable of manufacturing a window having improved reliability and accurately manufacturing the window with a thin thickness.

The disclosure provides a window manufacturing apparatus capable of manufacturing the window having improved reliability and accurately manufacturing the window with the thin thickness.

Embodiments provide a window manufacturing method. The method may include providing a mother substrate on a moving stage, the mother substrate including a cutting line; irradiating substantially simultaneously a first beam and a second beam to the mother substrate to cut the mother substrate and to form a target substrate; separating the target substrate from the mother substrate; and providing an etchant to the target substrate to chamfer the target substrate. A pulse energy of the first beam may be different from a pulse energy of the second beam and the first beam may be irradiated to the cutting line of the mother substrate, and the second beam may be irradiated to a point spaced apart from the cutting line of the mother substrate by a distance.

The distance may be equal to or less than about ⅓ of a thickness of the mother substrate.

Each of the pulse energy of the first beam and the pulse energy of the second beam may be equal to or greater than about 0.1 µJ and equal to or less than about 300 µJ.

The pulse energy of the second beam may be equal to or greater than about 30% of the pulse energy of the first beam and equal to or less than about 70% of the pulse energy of the first beam.

At least one of the first beam and the second beam may be a Bessel beam.

The mother substrate may have a thickness equal to or greater than about 10 µm and equal to or less than about 500 µm.

The first beam may penetrate the mother substrate to cut the mother substrate in a thickness direction of the mother substrate, and the second beam may cut a portion of the mother substrate in the thickness direction of the mother substrate.

The first beam and the second beam may be generated by a laser source.

The laser source may have a wavelength equal to or greater than about 250 nm and equal to or less than about 1500 nm.

The laser source may have a pulse duration equal to or greater than about 100 femtoseconds and equal to or less than about 10 nanoseconds.

The laser source may have a pulse repetition frequency equal to or greater than about 1 kHz and equal to or less than about 10 GHz.

The providing the etchant to the target substrate may include providing the etchant to form a surface inclined at a first angle with respect to an upper surface or a lower surface of the target substrate, and the first angle may be equal to or greater than about 40 degrees and equal to or less than about 90 degrees.

The etchant may include at least one of a hydrofluoric acid, a hydrochloric acid, and an ammonium fluoride.

The providing the etchant to the target substrate may further include adding an organic material to the etchant to increase a viscosity of the etchant.

The organic material may include at least one of a citric acid and a sucrose.

The cutting of the mother substrate may include irradiating a third beam, the third beam and the second beam having a same pulse energy, and the third beam being irradiated simultaneously with the first beam and the second beam, and a point to which the third beam is irradiated may be symmetrical with the point to which the second beam is irradiated with respect to the cutting line of the mother substrate.

Embodiments provide a window manufacturing apparatus including a moving stage including a mother substrate, the mother substrate including a cutting line; and a light irradiation module disposed above the moving stage that substantially simultaneously irradiates a center beam and one or more side beams to the mother substrate. The light irradiation module may include a laser source; and a light converter splitting the laser source into the center beam and the one or more side beams. The center beam may be irradiated to the cutting line of the mother substrate, the one or more side beams may be irradiated to at least one point spaced apart from the cutting line of the mother substrate by a distance, and the one or more side beams may have a pulse energy less than a pulse energy of the center beam.

The light converter may include a spatial light modulator or an axicon that emits the laser source as a Bessel beam.

The light converter may split the laser source into the center beam and the one or more side beams, and the at least one point to which the one or more side beams may be irradiated may be symmetrical with respect to a point to which the center beam may be irradiated.

The one or more side beams may have a same pulse energy.

According to the window manufacturing method, the window having an improved reliability is manufactured by accurately cutting and chamfering a thin substrate.

The window manufacturing apparatus is able to accurately cut a thin substrate into a desired shape.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1:
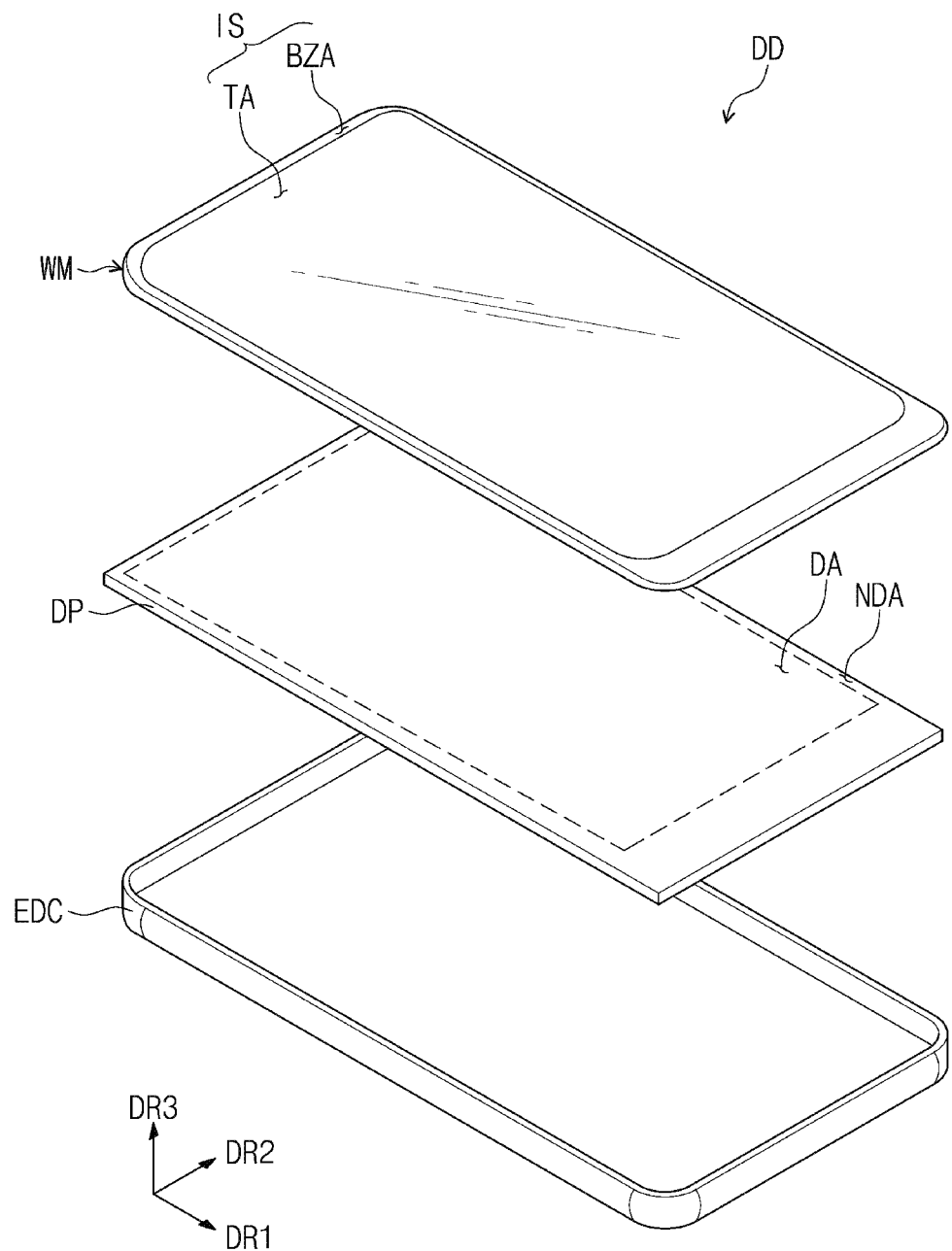
FIG. 1 is an exploded perspective view showing a display device according to an embodiment.

The disclosure may be variously modified and realized in many different forms, and thus embodiments will be illustrated in the drawings and described in detail hereinbelow. However, the disclosure should not be limited to the disclosed forms, and is to be construed to include all modifications, equivalents, or replacements included in the spirit and scope of the disclosure.

In the disclosure, it will be understood that when an element or layer is referred to as being "on", "connected to" or "coupled to" another element or layer, it can be directly on, connected or coupled to the other element or layer or intervening elements or layers may be present.

It will be understood that the terms "connected to" or "coupled to" may include a physical or electrical connection or coupling.

Like numerals refer to like elements throughout. In the drawings, the thickness, ratio, and dimension of components may be exaggerated for effective description of the technical content.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure.

As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

For example, the spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

In case that an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

It will be further understood that the terms "comprises," "comprising," "may include," and/or "including,", "has," "have," and/or "having," and variations thereof when used in this specification, specify the presence of stated features, integers, steps, operations, elements, and/or components, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a window manufacturing method and a window manufacturing apparatus will be explained in detail with reference to the accompanying drawings.

FIG. 1 is an exploded perspective view showing a display device DD according to an embodiment. A window WM manufactured using the window manufacturing method and the window manufacturing apparatus according to the disclosure may be applied to the display device DD. FIG. 1 shows the window WM applied to the display device DD.

The display device DD may be activated in response to electrical signals The display device DD may include various embodiments. As an example, the display device DD may be applied to a large-sized electronic item, such as a television set, an outdoor billboard, etc., and a small and medium-sized electronic item, such as a mobile phone, a tablet computer, a personal computer, a navigation unit, a game unit, etc., but it should not be limited thereto or thereby. The display device DD may be applied to other electronic items as long as they do not depart from the concept of the disclosure. FIG. 1 shows the mobile phone as a representative example of the display device DD.

Referring to FIG. 1, the display device DD may include the window WM, a display panel DP, and a case EDC. The display panel DP may be disposed between the window WM and the case EDC. The window WM may be connected or coupled with the case EDC to form an appearance of the display device DD.

The display panel DP may display an image in response to electrical signals and may transmit and receive information about an external input. The display panel DP may be a light-emitting type display panel, however, it should not be particularly limited. For instance, the display panel DP may be a liquid crystal display panel, an organic light emitting display panel, a quantum dot light emitting display panel, or the like within the spirit and the scope of the disclosure.

The display panel DP may include a display area DA and a non-display area NDA. The display area DA may be an area in which the image provided from the display panel DP is displayed, and the non-display area NDA may be an area in which the image is not displayed.

The display panel DP may display the image through the display area DA, which is substantially parallel to each of a first direction DR1 and a second direction DR2 crossing or intersecting the first direction DR1, toward a third direction DR3. In the disclosure, front (or upper) and rear (or lower) surfaces of each member of the display device DD may be defined with respect to a direction in which the image is displayed. The front and rear surfaces may be opposite to each other in the third direction DR3, and a normal line direction of each of the front and rear surfaces may be substantially parallel to the third direction DR3. A separation distance in the third direction DR3 between the front and rear surfaces may correspond to a thickness of each member. In the following descriptions, the expression "in a plan view" may mean a state of being viewed from the above of each member in the third direction DR3. Directions indicated by the first, second, and third directions DR1, DR2, and DR3 are relative to each other, and thus, the directions indicated by the first, second, and third directions DR1, DR2, and DR3 may be changed to other directions.

The non-display area NDA may be defined adjacent to the display area DA. As an example, the non-display area NDA may surround the display area DA, however, this is merely one example. According to an embodiment, the non-display area NDA may be defined adjacent to only one side or a side of the display area DA and may be defined in various shapes. According to an embodiment, the non-display area NDA may be omitted.

The display panel DP may include pixels disposed in the display area DA and a circuit portion disposed in the non-display area NDA. The circuit portion may apply electrical signals to the pixels to drive the pixels. The pixels may output the image through the display area DA in response to the electrical signals from the circuit portion.

The window WM may be disposed on the display panel DP and may protect the display panel DP from external impacts. The window WM may transmit the image exiting from the display panel DP, and a user may view the image through the window WM. The window WM may be rigid or flexible.

The window WM may include an optically transparent material. For example, the window WM may include a glass substrate. The window WM may include a transparent substrate manufactured by the manufacturing method and apparatus of the disclosure.

The window WM shown in FIG. 1 has a quadrangular shape with rounded corners, however, this is merely one example, and the window WM may have a variety of shapes. The shape of the window WM may vary depending on a design of the substrate manufactured by the manufacturing method and apparatus of the disclosure. It is to be understood that the shapes described herein may also include shapes substantial to the described shapes.

The window WM may have a single-layer or multi-layer structure. As an example, the window WM may have the single-layer structure of the glass substrate or the multi-layer structure of the glass substrate and a protective layer coated on the glass substrate or the glass substrate and a polymer film disposed on the glass substrate.

A front surface IS of the window WM may include a transmissive area TA and a bezel area BZA. The front surface IS of the window WM may correspond to a front surface of the display device DD.

The transmissive area TA may be an area in which the image from the display panel DP is displayed. The user may view the image through the transmissive area TA. The transmissive area TA may correspond to at least a portion of the display area DA of the display panel DP. In an embodiment, the transmissive area TA may have a quadrangular shape with rounded corners, however, this is merely one example. The transmissive area TA may be designed to have a variety of shapes.

The bezel area BZA may be defined adjacent to the transmissive area TA. The bezel area BZA may surround the transmissive area TA. Accordingly, the transmissive area TA may have a shape defined by the bezel area BZA, however, this is merely one example, and the bezel area BZA may be disposed adjacent to only one side or a side of the transmissive area TA or may be omitted.

The bezel area BZA may be an area in which the image is not displayed. The bezel area BZA may correspond to at least a portion of the non-display area NDA of the display panel DP. The bezel area BZA of the window WM may have a color. For example, the bezel area BZA may be an area correspond to a printed layer formed on a glass substrate that may be optically transparent and the printed layer may have a color.

The case EDC may be disposed under or below the display panel DP and may be connected or coupled with the window WM. The case EDC may absorb external impacts applied thereto, may prevent a foreign substance and moisture from entering the display panel DP, and may protect components accommodated in the case EDC. The case EDC may have a single body shape or may include bodies assembled with each other. As an example, the case EDC may include frames and/or plates including at least one of glass, plastic, and metal materials.

Although not shown in figures, the display device DD may further include at least one functional layer disposed between the display panel DP and the window WM. As an example, the display device DD may further include an input sensing layer and/or an anti-reflective layer. The input sensing layer may sense various external inputs applied thereto from outside from the display device DD. The anti-reflective layer may reduce a reflectance of the external light incident to the window WM from the above of the window WM. The functional layer disposed between the display panel DP and the window WM should not be particularly limited.

FIG. 1 shows the display device DD with a flat structure, however, the display device DD should not be limited thereto or thereby. As an example, the display device DD may have a structure able to be curved or folded with respect to a folding axis or may have a slidable structure.

Figure 2:
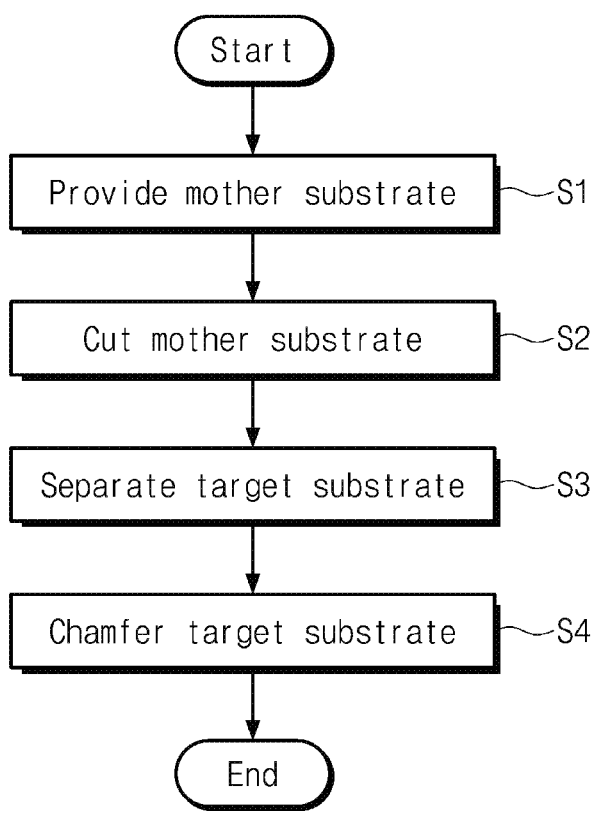
FIG. 2 is a flowchart showing a window manufacturing method according to an embodiment.

FIG. 2 is a flowchart showing a window manufacturing method according to an embodiment. A window manufactured by the window manufacturing method of FIG. 2 may correspond to the window WM of FIG. 1. The window manufacturing method may include providing a mother substrate (S1), irradiating a first beam and a second beam to the mother substrate to cut the mother substrate (S2), separating a target substrate (S3), and chamfering the target substrate (S4).

In the providing of the mother substrate (S1), the mother substrate may be provided to form the window WM. The mother substrate may be a substrate having an area greater than that of the window WM. The mother substrate may be an optically transparent glass substrate used to form the window WM.

The target substrate formed through the cutting of the mother substrate (S2) may be separated from the mother substrate (S3). The cutting of the mother substrate (S2) may include substantially simultaneously irradiating the first beam and the second beam, which have different pulse energies from each other. An area of the mother substrate on which the beam is irradiated may be cut, and one or more target substrates each of which may have an area less than that of the mother substrate may be formed.

After that, the target substrate is chamfered (S4) to form the window WM according to an embodiment. The chamfering (S4) may be performed by providing an etchant on the target substrate, however, this is merely one example. According to an embodiment, the chamfering process may be omitted in the window manufacturing method. The window manufacturing method will be described in detail with reference to the following drawings.

Figure 3:
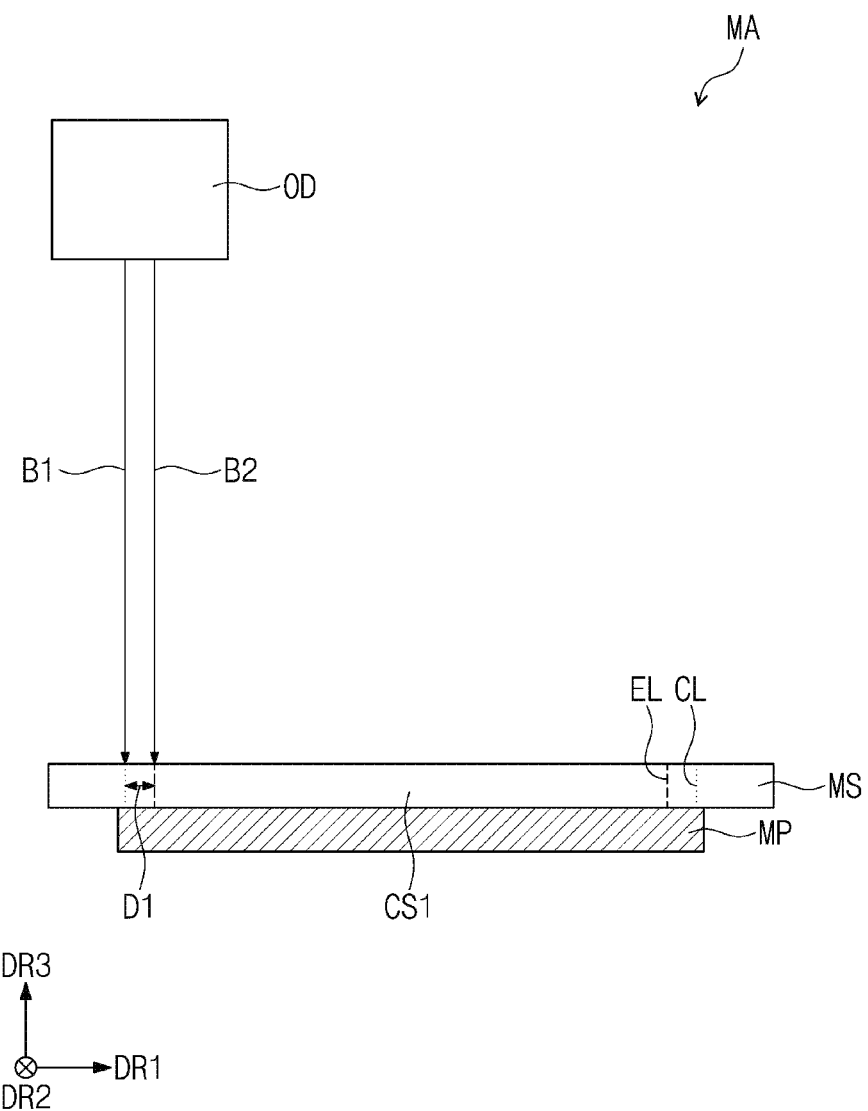
FIG. 3 is a schematic cross-sectional view showing a window manufacturing apparatus and a window manufacturing method according to an embodiment.

FIG. 3 is a schematic cross-sectional view showing a window manufacturing apparatus and one process of the window manufacturing method. The process shown in FIG. 3 may correspond to the irradiating of the beams B1 and B2 to the provided mother substrate MS to cut the mother substrate MS (S2) shown in FIG. 2. Hereinafter, a window manufacturing apparatus is referred to as a manufacturing apparatus.

A manufacturing apparatus MA may include a moving stage MP and a light irradiation module OD. The moving stage MP may support the mother substrate MS. The moving stage MP may provide the mother substrate MS such that the mother substrate MS faces the light irradiation module OD. The moving stage MP may move the mother substrate MS to allow the first beam B1 to be irradiated onto a cutting line CL defined in the mother substrate MS.

The light irradiation module OD may be disposed on the moving stage MP. The light irradiation module OD may be disposed to face the mother substrate MS. The light irradiation module OD may substantially simultaneously irradiate the beams B1 and B2 onto the mother substrate MS.

The mother substrate MS may be a substrate provided to manufacture the window and not yet processed. The mother substrate MS may be substantially parallel to a surface defined by the first direction DR1 and the second direction DR2 and may have a cuboidal shape whose thickness is defined in the third direction DR3. An upper surface or a lower surface of the mother substrate MS may be supported by the moving stage MP.

The mother substrate MS may include an optically transparent material. As an example, the mother substrate MS may be a glass substrate, and in detail, the mother substrate MS may include soda lime, alumino-boro-silicate, earthalkali-alumino-silicate, or earth-alkali-alumino-boro-silicate. However, a material for the mother substrate MS should not be limited thereto or thereby.

The thickness of the mother substrate MS may be defined along the third direction DR3. As an example, the thickness of the mother substrate MS may be equal to or greater than about 10 μm and equal to or less than about 500 μm. In detail, the thickness of the mother substrate MS may be equal to or greater than about 20 μm and equal to or less than about 150 μm.

The cutting line CL may be defined in the mother substrate MS to form the target substrate CS1. The cutting line CL is to set a partial area of the mother substrate MS to be cut in the cutting process (S2). The target substrate CS1 may be formed by cutting the mother substrate MS along the cutting line CL.

The beams B1 and B2 may include two or more beams having different pulse energies from each other. FIG. 3 shows the first beam B1 and the second beam B2, which are irradiated by the light irradiation module OD.

Referring to FIG. 3, the first beam B1 and the second beam B2 may be substantially simultaneously irradiated onto the mother substrate MS by the light irradiation module OD. The first beam B1 and the second beam B2 may be irradiated to allow an optical axis thereof to be substantially parallel to the thickness direction of the mother substrate MS.

The first and second beams B1 and B2 may include laser beams having different pulse energies. One of the first and second beams B1 and B2 may be a beam with the pulse energy that locally deforms the mother substrate MS from a surface to an inside of the mother substrate MS, and the other of the first and second beams B1 and B2 may be a beam with the pulse energy that passes through the mother substrate MS and cuts the mother substrate MS. As an example, the pulse energy of the first and second beams B1 and B2 may be equal to or greater than about 0.1 μJ and equal to or less than about 300 μJ.

The first beam B1 and the second beam B2 may be generated by one laser source. As an example, the first and second beams B1 and B2 may be formed by changing a phase and/or an intensity of the one laser source to split the laser source into the beams having different pulse energies.

At least one of the first beam B1 and the second beam B2 may be a beam that may be non-diffractive (hereinafter, referred to as a non-diffractive beam). The non-diffractive beam may be irradiated to have a uniform intensity on a point where the beam is irradiated without spreading while the beam propagates along the irradiation direction. As an example, at least one of the first beam B1 and the second beam B2 may be a Bessel beam.

The Bessel beam may have a relatively large depth of focus (DOF). As an example, the depth of focus of the Bessel beam may be ten times or more larger than a Gaussian beam. A beam having a larger depth of focus may be irradiated to have the uniform energy in the area where the beam is irradiated. Accordingly, the mother substrate MS may be more accurately processed with the Bessel beam. However, the beams B1 and B2 should not be particularly limited as long as the laser beam has the pulse energy.

The pulse energy of the first beam B1 may be different from the pulse energy of the second beam B2. As an example, the pulse energy of the first beam B1 may be greater than the pulse energy of the second beam B2. The first beam B1 having the relatively great pulse energy may pass through the upper surface and the lower surface of the mother substrate MS to cut the mother substrate MS. The second beam B2 having the pulse energy less than the pulse energy of the first beam B1 may locally deform the mother substrate MS from the upper surface and/or the lower surface of the mother substrate MS to the inside of the mother substrate MS along the thickness direction without penetrating the mother substrate MS and cutting the mother substrate MS.

In the disclosure, a beam having the greatest pulse energy among the beams B1 and B2 irradiated to the mother substrate MS may be defined as a center beam. As an example, the center beam may pass through the upper surface and the lower surface of the mother substrate MS to cut the mother substrate MS. A beam that has the pulse energy less than the pulse energy of the center beam and locally deforms the mother substrate MS from the surface of the mother substrate MS among the beams B1 and B2 may be defined as a side beam. The pulse energy of the side beam may be the second largest pulse energy after the pulse energy of the center beam. Referring to FIG. 3, the first beam B1 having the greatest pulse energy among the beams B1 and B2 may be referred to as the center beam, and the second beam B2 having the pulse energy less than that of the first beam B1 may be referred to as the side beam.

The first beam B1 may be irradiated to the cutting line CL. The second beam B2 may be irradiated to a point spaced apart from the cutting line CL by a first distance D1. A line connecting points to which the second beam B2 is irradiated may be referred to as an etching line EL. Accordingly, the etching line EL may be defined to be spaced apart from the cutting line CL by the first distance D1.

The first distance D1 may be controlled by the light irradiation module OD. A degree to which the target substrate CS1 is etched or a shape to which the target substrate CS1 is etched may vary depending on a size of the first distance D1.

The first distance D1 may be less than the thickness of the mother substrate MS. In detail, the first distance D1 may be equal to ⅓ of the thickness of the mother substrate MS or less than ⅓ of the thickness of the mother substrate MS. As an example, in a case where the thickness of the mother substrate MS is about 30 μm, the first distance D1 may be equal to or less than about 10 μm that may be about ⅓ of about 30 μm.

Figure 4:
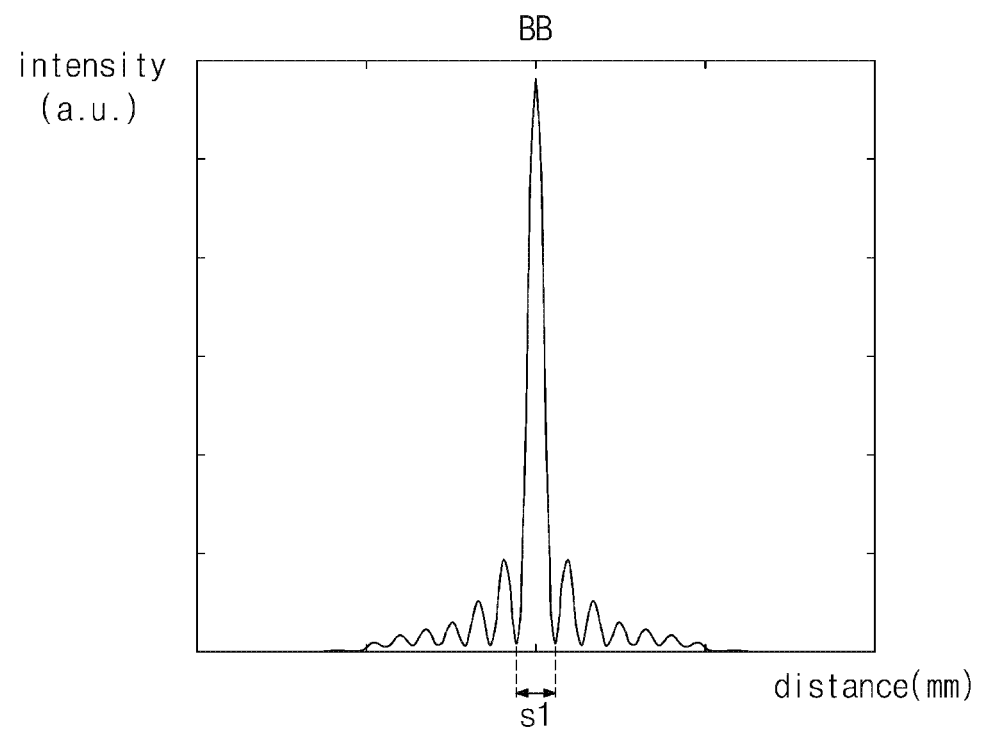
FIG. 4 is a graph showing an intensity of a Bessel beam as a function of a distance.
Figure 5A:
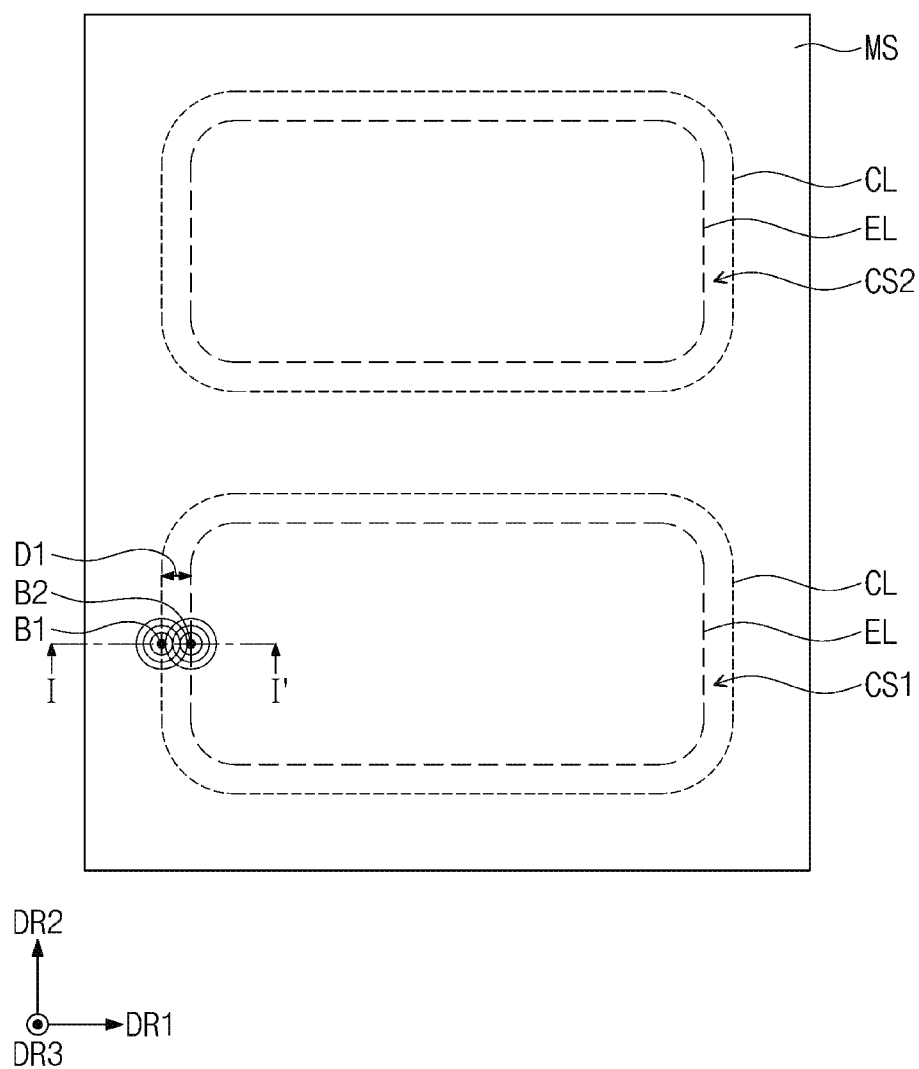
FIGS. 5A to 5C are schematic plan views showing a window manufacturing method according to an embodiment.
Figure 5B:
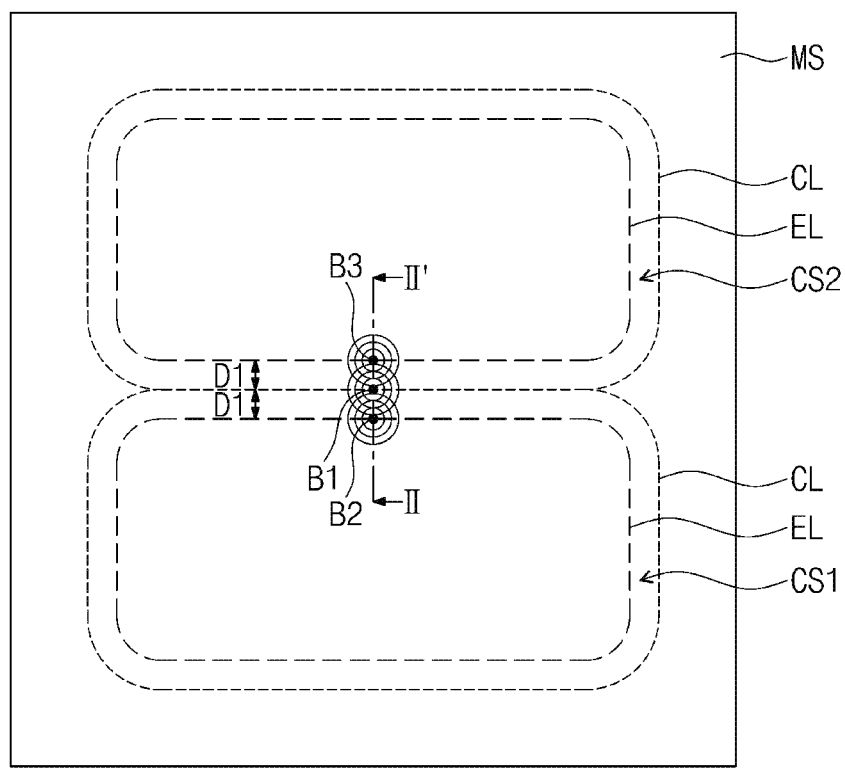
Figure 5C:
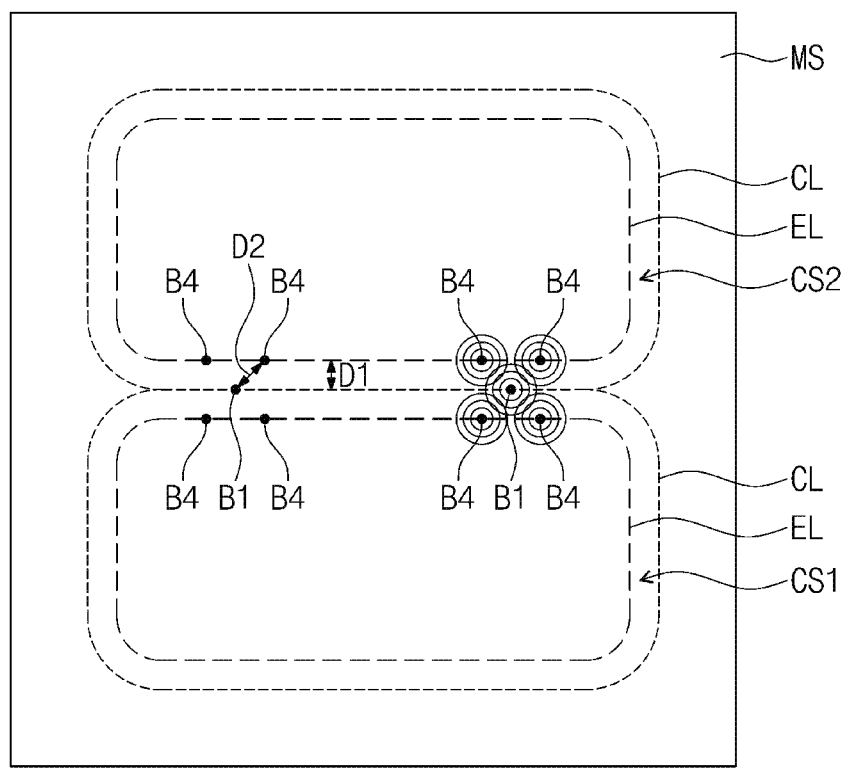
Figure 5C:
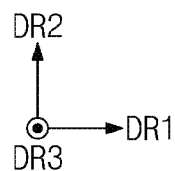

FIG. 4 is a graph showing an intensity of a Bessel beam as a function of a distance. FIGS. 5A to 5C are plan views showing the irradiating of the beams to the mother substrate MS to cut the mother substrate (S2) of FIG. 2. Details of the elements described above may also be applied to the same elements in FIGS. 5A to 5C. The embodiments shown in FIGS. 5A to 5C have different features from each other in the shape of the cutting line CL and/or the number of the beams.

FIGS. 5A to 5C show phases of beams B1, B2, B3, and B4 irradiated onto the mother substrate MS. Each of the beams B1, B2, B3, and B4 may be a Bessel beam and may have a phase including a core portion and rings surrounding the core portion in a plan view. An intensity of the beam in an area corresponding to the core portion may be relatively high, and an intensity of the beam in area corresponding to the rings may be relatively low.

In the graph of FIG. 4, the unit of the intensity of the Bessel beam is an arbitrary unit (a.u.) and represents a relative intensity with respect to the distance (mm, millimeter). Referring to FIG. 4, an intensity graph of the Bessel beam BB may be represented by curved lines convex upward. The Bessel beam BB may have the greatest beam intensity at a center and may have relatively low beam intensities at points spaced apart from the center by distances. The intensity graph of the Bessel beam BB may be symmetrical with respect to the center where the beam intensity is greatest. In the graph, a center area s1 may correspond to the core portion. An area of the graph corresponding to the center area s1 may substantially indicate the pulse energy of the beam. Areas having a small beam intensity and spaced apart from the center area s1 may correspond to the rings.

Referring to FIGS. 5A to 5C, the cutting line CL may have a closed-loop shape in a plan view. The cutting line CL may be defined to allow target substrates to be formed in the mother substrate MS. As an example, the cutting line CL may have closed-loop shapes in a plan view. FIGS. 5A to 5C show the cutting line CL defined to form two target substrates CS1 and CS2 as a representative example, however, the number of the target substrates to be formed should not be limited thereto or thereby.

As shown in FIG. 5A, the cutting lines CL defined to form the target substrates CS1 and CS2 may be spaced apart from each other, however, they should not be limited thereto or thereby. As shown in FIGS. 5B and 5C, portions of the cutting lines CL forming the target substrates CS1 and CS2 may overlap each other, and a portion of the overlapping cutting lines CL may be defined as a common line. In a case where the cutting lines CL are defined to include the common line, the mother substrate MS used to form the target substrates CS1 and CS2 may be efficiently used. As an example, the number of the target substrates that are formed along the cutting lines CL including the common line may be greater than the number of the target substrates that are formed along the cutting lines CL defined to be spaced apart from each other based on the mother substrate MS having a same area. However, the shape of the cutting line CL should not be limited to those shown in FIGS. 5A to 5C and may be defined in various ways depending on the size and/or design of the target substrates.

The number of the beams irradiated to the mother substrate MS may be changed. The beams may include the center beam having the greatest pulse energy among the beams and at least one side beam irradiated to the point spaced apart from the point to which the center beam is irradiated and having the pulse energy less than the pulse energy of the center beam. The number of the beams may be adjusted by the light irradiation module OD (refer to FIG. 3).

FIG. 5A shows an embodiment in which one center beam B1 (or the first beam B1) and one side beam B2 (or the second beam B2) are irradiated, FIG. 5B shows an embodiment in which one center beam B1 and two side beams B2 and B3 (or the second beam B2 and a third beam B3) are irradiated, and FIG. 5C shows an embodiment in which one center beam B1 and four side beams B4 (or fourth beams B4) are irradiated. The number of the beams irradiated to the mother substrate MS should not be particularly limited as long as the beams include two or more beams having different pulse energies from each other.

Referring to FIG. 5A, the first beam B1 may be irradiated along the cutting line CL. As described above, the moving stage MP (refer to FIG. 3) may move the mother substrate MS to allow the first beam B1 to be irradiated along the cutting line CL. Accordingly, the second beam B2 may be irradiated to the etching line EL spaced apart from the cutting line CL by the first distance D1 at the same time in case that the first beam B1 is irradiated.

Figure 6A:
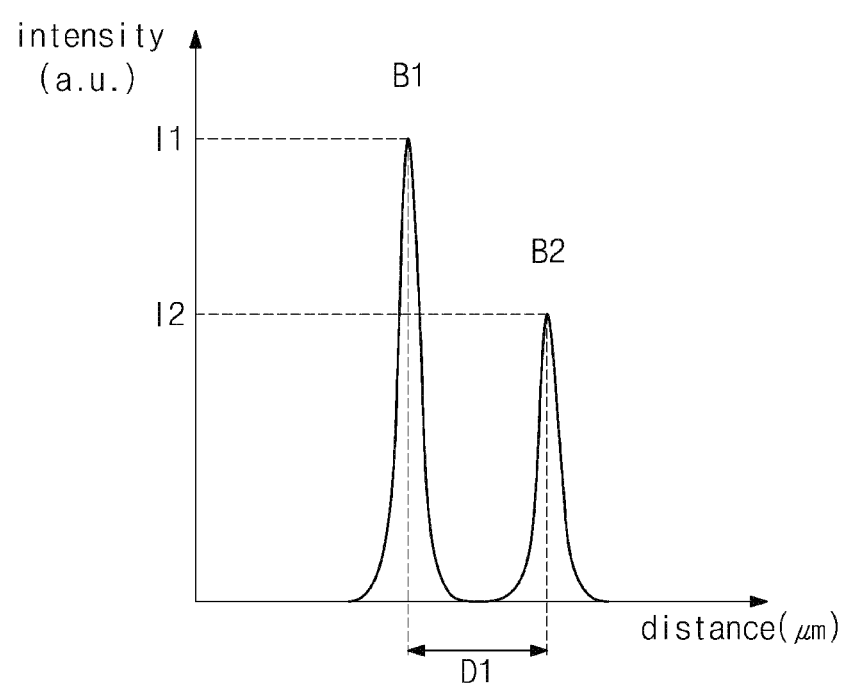
FIG. 6A is a graph showing an intensity of beams as a function of a distance in an area corresponding to line I-I' shown in FIG. 5A.

FIG. 6A is a graph showing a beam intensity in the core portion of each of the center beam B1 (or the first beam B1) and the side beam B2 (or the second beam B2) in an area corresponding to line I-I' shown in FIG. 5A.

In the graph of FIG. 6A, the unit of the beam intensity is an arbitrary unit (a.u.). and represents a relative intensity with respect to the distance (μm, micrometer). Referring to FIG. 6A, the intensity of the first beam B1 may be greater than the intensity of the second beam B2. For example, the intensity of the center beam B1 may be greater than the intensity of the side beam B2. A distance between a point at which the intensity of the first beam B1 is greatest and a point at which the intensity of the second beam B2 is greatest on the mother substrate MS may correspond to the first distance D1.

An area of the graph of the first beam B1 may correspond to the pulse energy of the first beam B1. An area of the graph of the second beam B2 may correspond to the pulse energy of the second beam B2. The pulse energy of the second beam B2 may be less than the pulse energy of the first beam B1. For example, the pulse energy of the side beam may be less than the pulse energy of the center beam.

The pulse energy of the second beam B2 may be equal to or less than about 70% of the pulse energy of the first beam B1. In detail, the pulse energy of the second beam B2 may be equal to or greater than about 30% and equal to or less than about 70% of the pulse energy of the first beam B1. A ratio of the pulse energy of the second beam B2 to the pulse energy of the first beam B1 may be determined depending on the material and the thickness of the mother substrate MS.

Referring to FIG. 5B, the first beam B1 may be irradiated along the cutting line CL, and the second beam B2 may be irradiated to the point spaced apart from the cutting line CL by the first distance D1. The third beam B3 may be irradiated substantially simultaneously with the first beam B1 and the second beam B2 and may be irradiated to a point different from the points to which the first beam B1 and the second beam B2 are irradiated, respectively. As an example, the third beam B3 may be irradiated to the point symmetrical with the point to which the second beam B2 is irradiated with respect to the point to which the first beam B1 is irradiated. The point to which the third beam B3 is irradiated may be spaced apart from the cutting line CL by the first distance D1, and the third beam B3 may be irradiated to the point different from the point to which the second beam B2 is irradiated. The distance between the first beam B1 and the second beam B2, which are substantially simultaneously irradiated, and the distance between the first beam B1 and the third beam B3, which are substantially simultaneously irradiated, may be substantially the same as the first distance D1.

Referring to FIG. 5C, the first beam B1 may be irradiated along the cutting line CL, and the fourth beams B4 may be irradiated to the etching line EL spaced apart from the cutting line CL by the first distance D1. A distance D2 between the point to which the first beam B1 is irradiated and the points to which the fourth beams B4 are irradiated simultaneously with the first beam B1 may be different from the first distance D1 between the cutting line CL and the etching line EL.

Accordingly, referring to FIGS. 5B and 5C, the side beams B2, B3, and B4 may be irradiated to the points symmetrical with respect to the point to which the center beam B1 is irradiated. The distances between the point to which the center beam B1 is irradiated and the points to which the side beams B2, B3, and B4 are irradiated may be substantially the same as or different from the distance between the cutting line CL overlapping the point to which the center beam B1 is irradiated and the etching line EL overlapping the points to which the side beams B2, B3, and B4 are irradiated. The distances are changed depending on positions of the phases of the beams B1, B2, B3, and B4.

The mother substrate MS may be efficiently cut according to the shape of the cutting line CL defined in the mother substrate MS, the number of the beams B1, B2, B3, and B4 irradiated to the mother substrate MS, and the distances between the beams B1, B2, B3, and B4. As an example, referring to FIG. 5B, in case that the first beam B1 is irradiated along the common line, the second beam B2 may be irradiated to the etching line EL spaced apart from the cutting line CL toward one target substrate CS1 by the first distance D1, and the third beam B3 may be irradiated to the etching line EL spaced apart from the cutting line CL toward another target substrate CS2 by the first distance D1. Accordingly, a time during which the beams B1, B2, B3, and B4 are irradiated to form the target substrates CS1 and CS2 in the cutting process (S2) may be reduced.

Figure 6B:
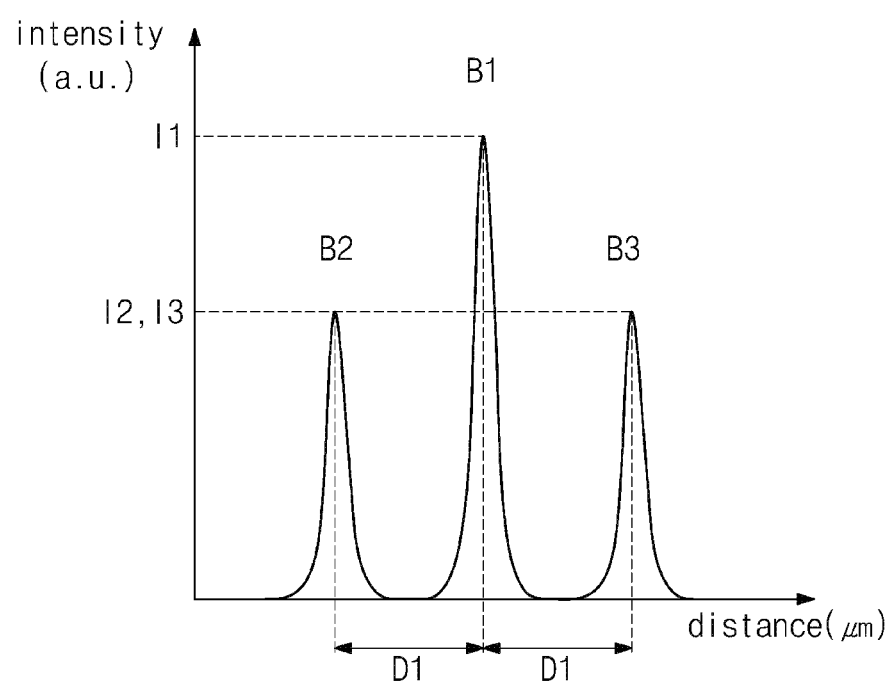
FIG. 6B is a graph showing an intensity of beams as a function of a distance in an area corresponding to line II-II' shown in FIG. 5B.

FIG. 6B is a graph showing a beam intensity in the core portion of each of the center beam B1 (or the first beam B1) and the side beams B2 and B3 (or the second beam B2 and the third beam B3) in an area corresponding to line II-II' shown in FIG. 5B.

In the graph of FIG. 6B, the unit of the beam intensity is an arbitrary unit (a.u.). and represents a relative intensity with respect to the distance (μm, micrometer). Referring to FIG. 6B, the intensity of the first beam B1 may be greater than the intensity of each of the second beam B2 and the third beam B3. For example, the intensity of the center beam B1 may be greater than the intensity of each of the side beams B2 and B3. A distance between the point at which the intensity of the first beam B1 irradiated to the mother substrate MS is greatest and the point at which the intensity of the second beam B2 is greatest may be substantially the same as a distance between the point at which the intensity of the first beam B1 is greatest and the point at which the intensity of the third beam B3 is greatest. The second beam B2 and the third beam B3 may be irradiated to the points symmetrical with each other with respect to the point to which the first beam B1 is irradiated.

An area of the graph of each of the first beam B1, the second beam B2, and the third beam B3 shown in FIG. 6B may correspond to the pulse energy of a corresponding beam among the beams. The pulse energy of the second beam B2 and the pulse energy of the third beam B3 may be less than the pulse energy of the first beam B1. The pulse energy of the second beam B2 and the pulse energy of the third beam B3 may be substantially the same as each other. For example, the pulse energy of each of the side beams may be less than the pulse energy of the center beam, and the side beams may have the same pulse energy as each other.

The pulse energy of each of the second beam B2 and the third beam B3 may be equal to or less than about 70% of the pulse energy of the first beam B1. In detail, the pulse energy of each of the second beam B2 and the third beam B3 may be equal to or greater than about 30% and equal to or s less than about 70% of the pulse energy of the first beam B1.

Figure 7A:
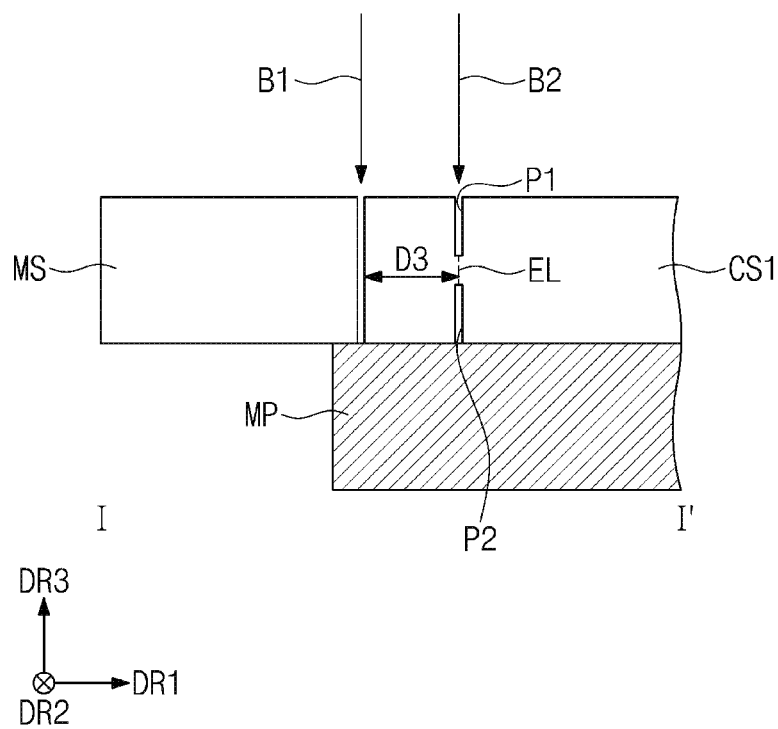
FIG. 7A is a schematic cross-sectional view taken along the line I-I' shown in FIG. 5A to show a window manufacturing method according to an embodiment.
Figure 7B:
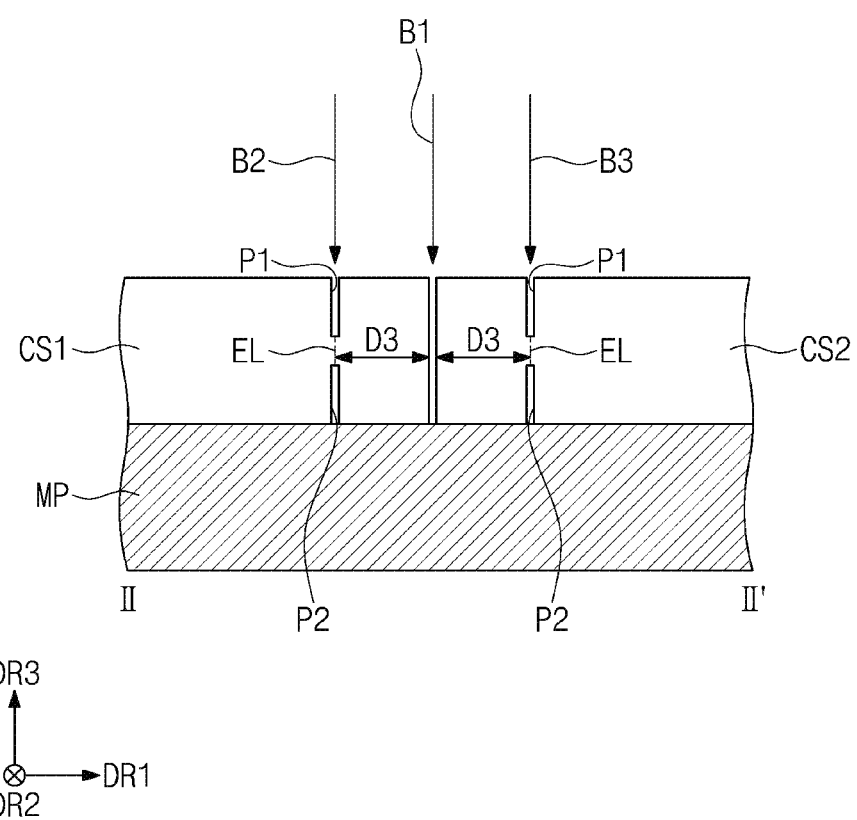
FIG. 7B is a schematic cross-sectional view taken along the line II-II' shown in FIG. 5B to show a window manufacturing method according to an embodiment.

FIG. 7A is a schematic cross-sectional view taken along the line I-I' shown in FIG. 5A to show a process of a window manufacturing method according to an embodiment. FIG. 7B is a schematic cross-sectional view taken along the line II-II' shown in FIG. 5B to show a process of a window manufacturing method according to an embodiment. FIGS. 7A and 7B are enlarged schematic cross-sectional views showing a portion of the mother substrate MS on which the cutting process (S2) is completed.

FIG. 7A shows a cross-section corresponding to one cutting line CL among the cutting lines CL forming the target substrates CS1 and CS2.

The first beam B1 and the second beam B2 may be irradiated to the surface of the mother substrate MS. In case that the first beam B1 and the second beam B2 are irradiated, the first and second beams B1 and B2 may apply the energy to the inside of the mother substrate MS at the uniform intensity in the thickness direction of the mother substrate MS to overlap the points to which the first and second beams B1 and B2 are irradiated.

The intensity of the laser beam that causes a damage on the surface of the mother substrate MS may be less than the intensity of the laser beam that causes the damage on a center portion of the mother substrate MS, which corresponds to a center position of the mother substrate MS in the thickness direction. In a case where the laser beam having the energy enough to damage the center portion of the mother substrate MS is applied to the surface of the mother substrate MS, a hole may be formed through the upper surface and the lower surface to the center portion of the mother substrate MS. As a result, the hole that overlaps the point to which the laser beam is irradiated and penetrates from the upper surface to the lower surface of the mother substrate MS may be formed through the mother substrate MS. The hole may correspond to a cut portion which is described later and formed penetrating through the upper surface and the lower surface of the mother substrate MS by the first beam B1.

In a case where the laser beam having the energy able to damage the surface of the mother substrate MS is irradiated to the surface of the mother substrate MS, an upper or/and lower portion of the mother substrate MS is partially removed except the center portion of the mother substrate MS, and thus, a groove recessed from the surface of the mother substrate MS may be formed. In a case where the laser beam having the energy that causes the damage on the surface of the mother substrate MS is applied to the inside of the mother substrate MS at the uniform intensity, the groove recessed from the upper surface and the lower surface of the mother substrate MS to the center portion may be formed in the mother substrate MS. The recessed groove may correspond to portions P1 and P2 that are described later and formed by partially cutting or deforming the mother substrate MS from the upper surface and/or the lower surface of the mother substrate MS along the thickness direction of the mother substrate MS by the side beam like the second beam B2. Hereinafter, the portions that are formed by partially cutting or deforming the mother substrate MS from the upper surface and/or the lower surface of the mother substrate MS along the thickness direction of the mother substrate MS are referred to as deformed portions P1 and P2.

Referring to FIG. 7A, the mother substrate MS may be cut to allow the portion corresponding to the point to which the first beam B1 is irradiated to be penetrated from the upper surface to the lower surface. Accordingly, in case that the first beam B1 is irradiated along the cutting line CL (refer to FIGS. 3 and 5A), the mother substrate MS is cut along the cutting line CL, and thus, the target substrate CS1 is formed. The target substrate CS1 cut by the first beam B1 may be separated from the mother substrate MS.

The deformed portions P1 and P2 may be recessed from the upper surface and the lower surface and may be formed in the mother substrate MS to overlap the point to which the second beam B2 is irradiated. The deformed portions P1 and P2 may have a depth defined in the third direction DR3 and the depth of each of the deformed portions P1 and P2 is adjusted by the intensity of the second beam B2. The deformed portions P1 and P2 may be formed to overlap the etching line EL. A distance D3 from the cut portion of the target substrate CS1 to the deformed portions P1 and P2 may be substantially the same as the first distance D1 (refer to FIG. 5A).

FIG. 7B shows a cross-section of a portion in which the cutting lines CL forming the target substrates CS1 and CS2 overlap each other, for example, a portion corresponding to the common line. Referring to FIG. 7B, the first beam B1 may be irradiated along the cutting line CL (refer to FIGS. 3 and 5B) to penetrate through the upper surface and the lower surface of the mother substrate MS (refer to FIG. 5B), and thus, the mother substrate MS (refer to FIG. 5B) may be cut. Even though the first beam B1 is irradiated only once along the common line, the target substrates CS1 and CS2 may be cut and separated from each other. The target substrates CS1 and CS2 cut by the first beam B1 may be separated from the mother substrate MS.

The second beam B2 and the third beam B3 may be irradiated to the points spaced apart from the point to which the first beam B1 is irradiated by the first distance D1 (refer to FIG. 5B) and symmetrical with each other. The second beam B2 and the third beam B3 having the pulse energy less than that of the first beam B1 may deform only a portion from the surface of the mother substrate MS (refer to FIG. 5B). As an example, one of the deformed portions P1 and P2 may be formed in one target substrate CS1 to overlap the etching line EL by the second beam B2, and the other of the deformed portions P1 and P2 may be formed in another target substrate CS2 to overlap the etching line EL by the third beam B3. The distance D3 from the cut portion between the target substrates CS1 and CS2 to the deformed portions P1 and P2 formed in each of the target substrates CS1 and CS2 may be substantially the same as the first distance D1 (refer to FIG. 5B).

Figure 8A:
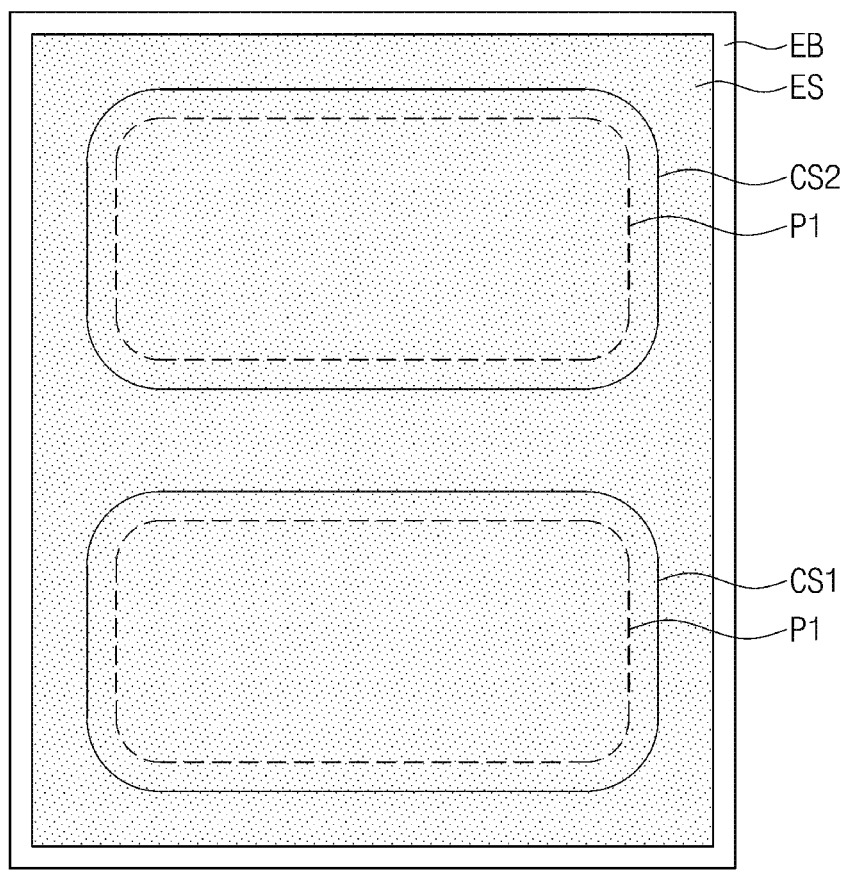
FIG. 8A is a schematic plan view showing a window manufacturing method according to an embodiment.
Figure 8B:
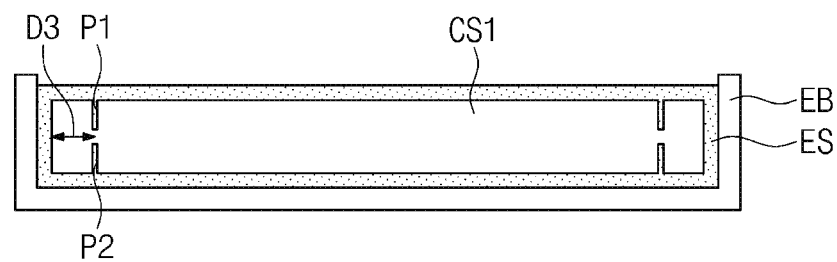
FIG. 8B is a schematic cross-sectional view showing a window manufacturing method according to an embodiment.
Figure 8B:
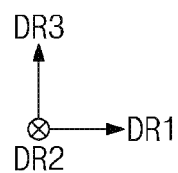

FIG. 8A is a plan view showing a process of a window manufacturing method according to an embodiment. FIG. 8B is a schematic cross-sectional view showing a process of a window manufacturing method according to an embodiment. FIGS. 8A and 8B show a process corresponding to the chamfering process (S4) of FIG. 2, which provides the etchant ES on the target substrates CS1 and CS2 separated from the mother substrate (refer to FIGS. 5A and 5B).

In case that the cutting process (S2) is completed, the target substrates CS1 and CS2 may be separated from the mother substrate (S3). The etchant ES may be provided onto the target substrates CS1 and CS2 to chamfer the target substrates CS1 and CS2. The chamfering refers to a process of rounding corners of the target substrates CS1 and CS2, which are sharply cut.

The providing of the etchant ES may be carried out by a spraying method that sprays the etchant ES onto the target substrates CS1 and CS2 or a dipping method that dips the target substrates CS1 and CS2 into the etchant ES, however, it should not be limited thereto or thereby. FIGS. 8A and 8B show the dipping method as a representative example.

Referring to FIGS. 8A and 8B, the etchant ES may be contained in a bath EB. The target substrates CS1 and CS2 may be dipped into the etchant ES. As an example, the target substrates CS1 and CS2 may be dipped into the etchant ES such that all surfaces of the target substrates CS1 and CS2 may be in contact with the etchant ES.

The etchant ES may include at least one of a hydrofluoric acid (HF), a hydrochloric acid (HCL), and an ammonium fluoride ($NH_4F$). However, a material for the etchant ES should not be limited thereto or thereby.

The chamfered shape of the target substrates CS1 and CS2 may be changed depending on the etching rate, the etching amount, or the distance D3 from an end of the corner of the target substrates CS1 and CS2 to the deformed portions P1 and P2. As a concentration and a temperature of the etchant ES increase, the etching rate may increase, and as the etching time increases, the etching amount may increase.

According to an embodiment, the window manufacturing method may further include adding a material to the etchant ES to increase a viscosity of the etchant ES. The viscosity of the etchant ES to which the material increasing the viscosity is added may increase by about 50% in case that compared with the viscosity of the etchant ES to which the material increasing the viscosity is not added. However, a degree of the increase in viscosity of the etchant ES should not be limited to the above-mentioned value.

The material that increases the viscosity of the etchant ES may include an organic material. In detail, the material that increases the viscosity of the etchant ES may include at least one of citric acid and sucrose. However, the material that increases the viscosity of the etchant ES should not be limited thereto or thereby.

The etchant ES whose viscosity increases may anisotropically etch the target substrates CS1 and CS2. As an example, in the case where the target substrates CS1 and CS2 are anisotropically etched, a degree to which the upper and lower surfaces are etched along the thickness direction of the target substrates CS1 and CS2 may be different from a degree to which the corners of the target substrates CS1 and CS2 are etched. Accordingly, the etchant ES whose viscosity increases may etch the corners to be rounded without reducing the thickness of the target substrates CS1 and CS2.

Figure 9:
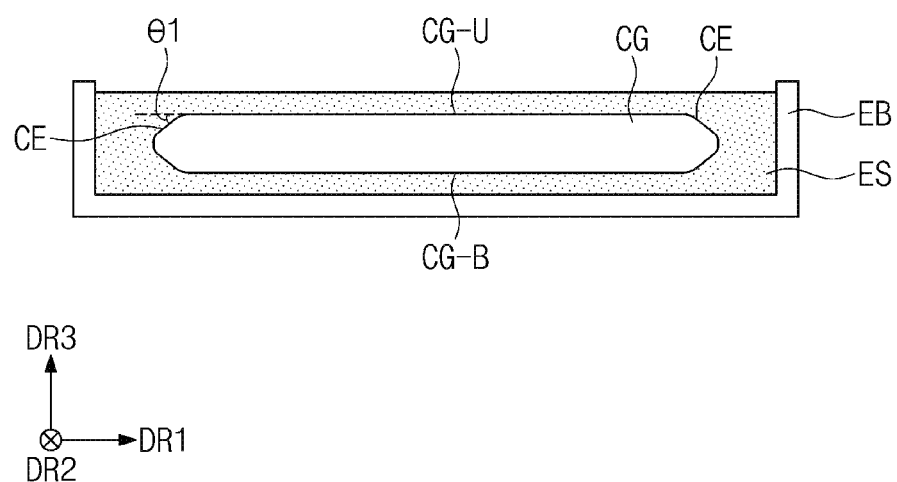
FIG. 9 is a schematic cross-sectional view showing a window manufacturing method according to an embodiment.

FIG. 9 is a schematic cross-sectional view showing a process of a window manufacturing method according to an embodiment. FIG. 9 is a schematic cross-sectional view showing the target substrate CS1 of FIG. 8B to which the chamfering process (S4) is applied.

Referring to FIG. 9, the cross-section of the sharply cut corner of the target substrate CS1 (refer to FIG. 8B) may be rounded through the chamfering process (S4). Hereinafter, a target substrate CG to which the chamfering process (S4) is applied will be assigned with a new number. The corner of the target substrate CG, which is formed through the chamfering process (S4), may include a slope surface CE, which is smooth. The target substrate CG separated from the etchant ES may correspond to the window WM (refer to FIG. 2).

The slope surface CE inclined with respect to an upper surface CG-U and/or a lower surface CG-B of the target substrate CG at a first angle $\theta 1$ may be formed in the target substrate CG etched by the etchant ES through the chamfering process (S4). The first angle $\theta 1$ may be equal to or greater than about 40 degrees and equal to or less than about 90 degrees. The position and the angle of the slope surface CE may be controlled by the position and the depth of the deformed portions P1 and P2 (refer to FIG. 8B) formed by the second beam B2.

The target substrate CG formed through the chamfering process (S4) may have a thickness less than the thickness of the target substrate CS1 that are not dipped into the etchant ES. As the etching time during which the target substrates CS1 and CS2 are exposed to the etchant ES increases, the thickness of the target substrate CG may be reduced, and the corner of the target substrate CG may be formed more smoothly. Accordingly, the target substrate CG having a desired shape may be manufactured by appropriately adjusting the etching time during which the target substrates CS1 and CS2 (refer to FIG. 8A) are exposed to the etchant ES.

Figure 10A:
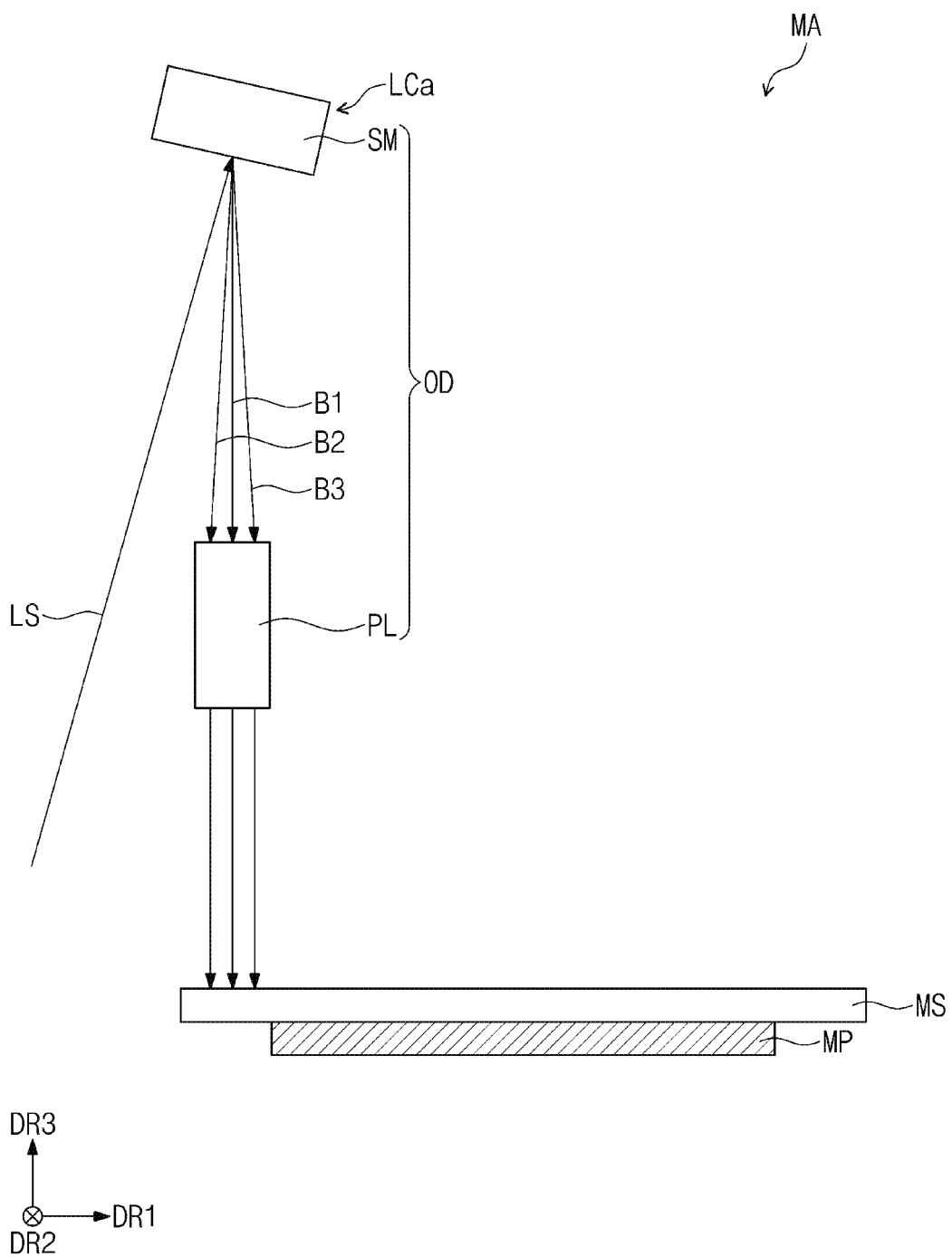
FIGS. 10A to 10C are schematic cross-sectional views showing a window manufacturing apparatus according to an embodiment.
Figure 10B:
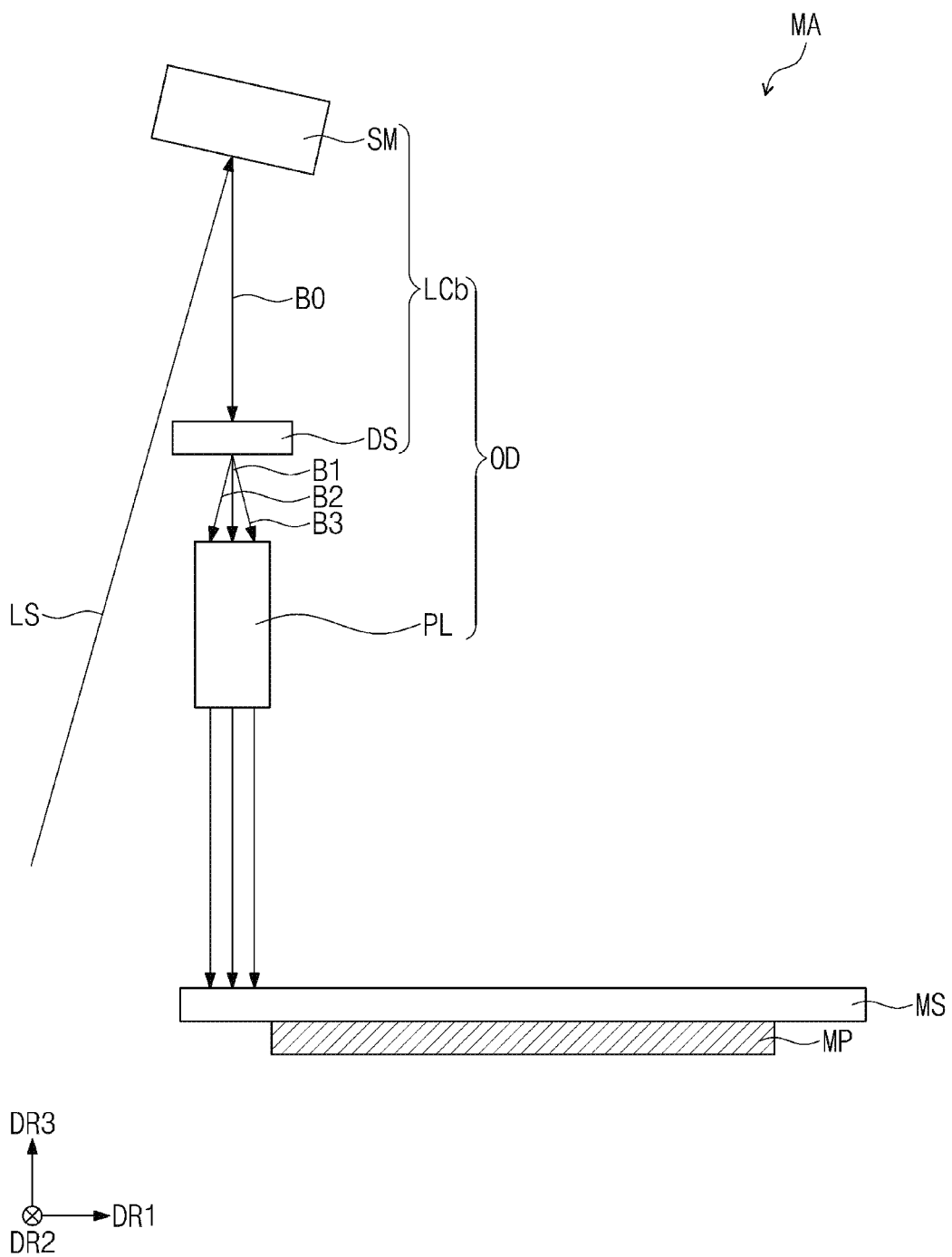
Figure 10C:
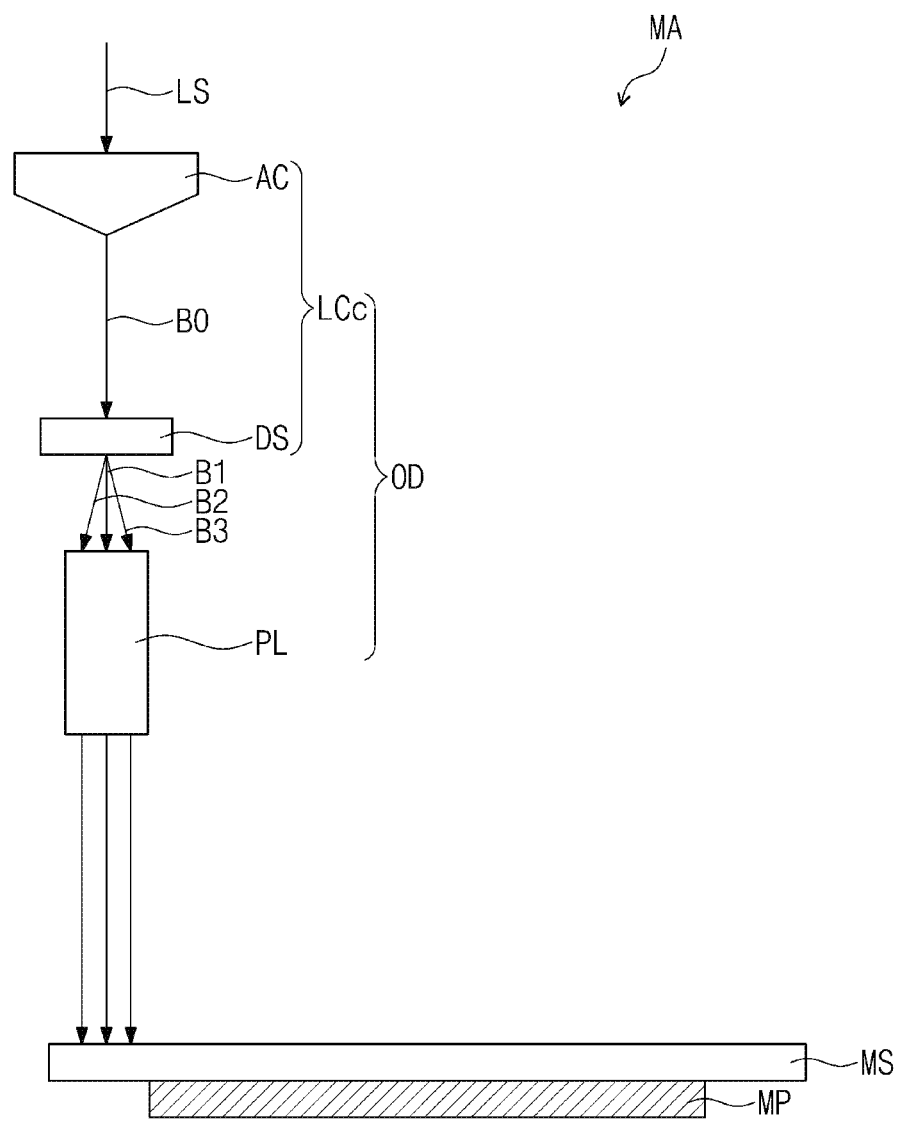

FIGS. 10A to 10C are schematic cross-sectional views showing the window manufacturing apparatus MA according to an embodiment. The window manufacturing apparatus MA shown in FIGS. 10A to 10C. may include substantially the same components as those of the manufacturing apparatus MA, and details of the elements described above may also be applied to the same elements of the window manufacturing apparatus MA shown in FIGS. 10A to 10C.

Referring to FIGS. 10A to 10C, light irradiation modules OD may include a laser source LS, light converters LCa, LCb, and LCc splitting the laser source LS into beams B1, B2, and B3, and a light projector PL. FIGS. 10A, 10B, and 10C show the light converters LCa, LCb, and LCc having different configurations, respectively, and show three beams B1, B2, and B3 split by the light converters LCa, LCb, and LCc. However, the number of beams should not be limited thereto or thereby.

The laser source LS may be a pulse laser. The laser source LS may have an intensity appropriate to form the target substrate CS1. As an example, a pulse duration of the laser source may be equal to or greater than about 100 femtoseconds and equal to or less than about 10 nanoseconds, and in detail, the pulse duration of the laser source may be equal to or greater than about 5 picoseconds and equal to or less than about 150 picoseconds. The laser source may have a wavelength equal to or greater than about 250 nm and equal to or less than about 1500 nm, and in detail, the wavelength of the laser source may be equal to or greater than about 343 nm and equal to or less than about 1064 nm. The laser source may have a pulse repetition frequency equal to or greater than about 1 kHz and equal to or less than about 10 GHz, and by way of example, about 100 kHz.

The light projector PL may be disposed under or below the light converters LCa, LCb, and LCc. The light projector PL may control a focus of the beams B1, B2, and B3 emitted from the light converters LCa, LCb, and LCc to allow the beams B1, B2, and B3 to be projected to accurate positions on the mother substrate MS. The light projector PL may include at least one lens.

Referring to FIG. 10A, the light converter LCa may include a spatial light modulator SM that modifies a phase and/or an intensity of the laser source LS to split the laser source into the beams B1, B2, and B3. The spatial light modulator SM may include a phase mask that modifies the phase and/or the intensity of the laser source LS incident thereto. The phase, intensity, and position of the beams B1, B2, and B3 may be changed depending on a design of the phase mask.

The spatial light modulator SM may modulate the laser source LS incident thereto to at least one Bessel beam and may emit the modulated beam through an exit surface thereof. As an example, at least one of the beams B1, B2, and B3 emitted from the spatial light modulator SM may be the Bessel beam. However, the beams B1, B2, and B3 emitted from the spatial light modulator SM should not be limited thereto or thereby.

Referring to FIG. 10B, the light converter LCb may include a spatial light modulator SM and a light splitter DS. The spatial light modulator SM may emit the laser source LS incident thereto as a single Bessel beam B0 according to a design of a phase mask.

The light splitter DS may be disposed between the spatial light modulator SM and a light projector PL. The light splitter DS may split the single beam Bo emitted from the spatial light modulator SM into beams B1, B2, and B3. As an example, the light splitter DS may include a diffractive beam splitter. However, the light splitter DS should not be limited thereto or thereby.

Referring to FIG. 10C, the light converter LCc may include an axicon AC and a light splitter DS. The axicon AC may include a lens with a conical surface. The axicon AC may emit the laser source LS as a single Bessel beam B0. The light splitter DS may be disposed between the axicon AC and a light projector PL and may split the single beam Bo into beams B1, B2, and B3.

Although not shown in figures, the light irradiation modules OD may further include a mirror that reflects the laser source LS to change a propagation path of the laser source LS. The mirror may control the propagation path of the laser source LS to allow the laser source LS to be incident to an incident surface of the spatial light modulator SM or the axicon AC.

According to an embodiment, the window manufacturing apparatus MA may further include an etching device to chamfer the cut target substrate. The etching device may include a spray spraying an etchant onto the target substrate or a bath containing the etchant. Details of the etchant described above may be applied to the etchant included in the window manufacturing apparatus MA.

FIGS. 11A to 11D are simulated images showing the chamfering of the target substrate according to an embodiment. FIGS. 12A to 12C are enlarged images showing the target substrate manufactured by the window manufacturing method and the window manufacturing apparatus according to an embodiment.

FIGS. 11A to 11D respectively show the simulated images of the chamfered target substrate according to the etching time. The etchant and the etching temperature set to simulate the chamfering (S4) of the target substrate are as follows. The etching temperature is set to a room temperature, the etchant may include the hydrofluoric acid (HF), and the concentration of the etchant is set to about 2.5%.

Figure 11A:
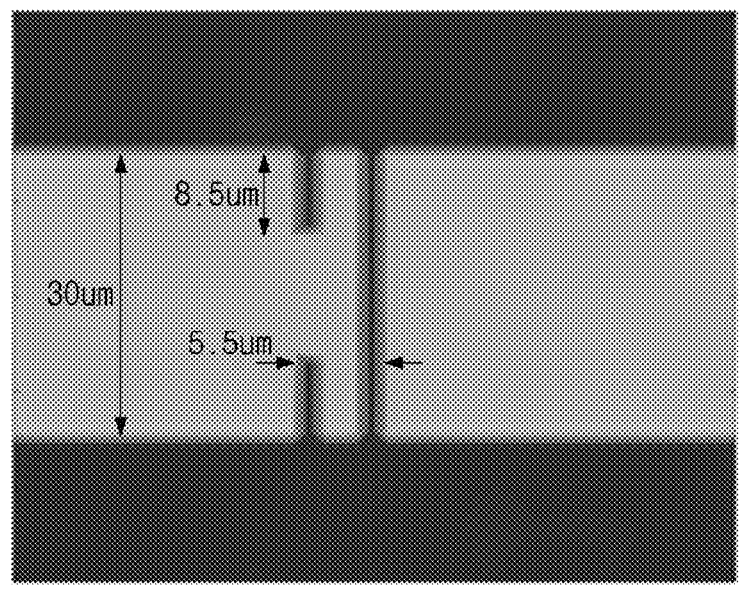
FIGS. 11A to 11D are simulated images showing a process of chamfering a target substrate according to an embodiment.
Figure 12A:
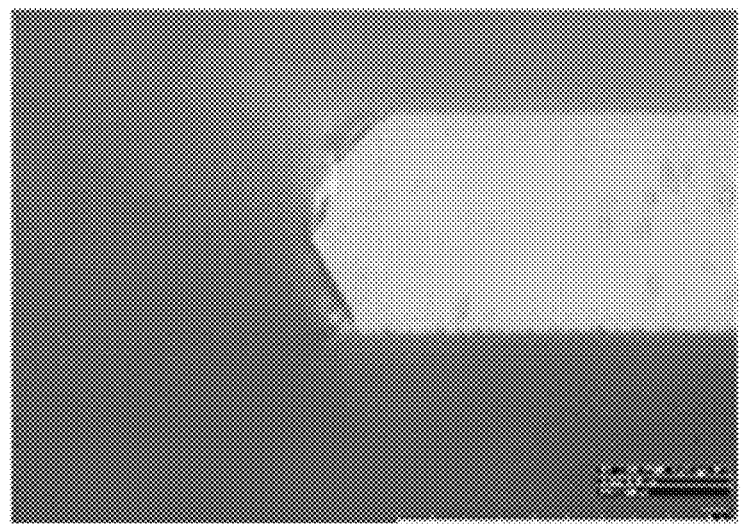
FIGS. 12A to 12C are enlarged images showing a target substrate manufactured by a window manufacturing method and a window manufacturing apparatus according to an embodiment.
Figure 12B:
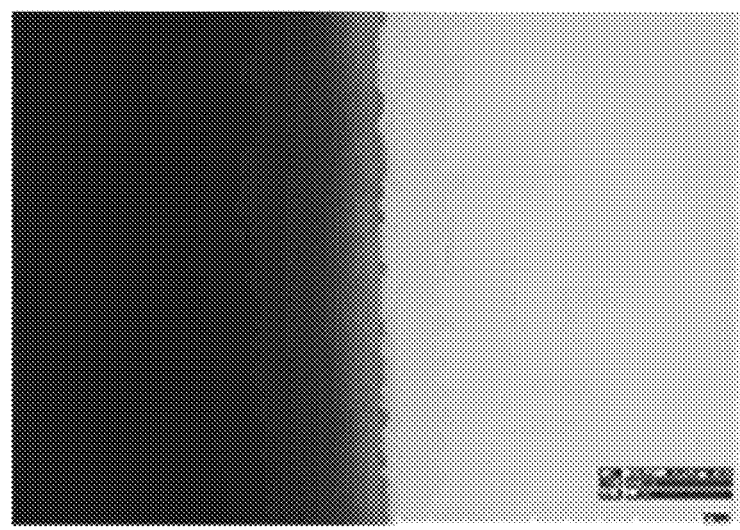
Figure 12C:
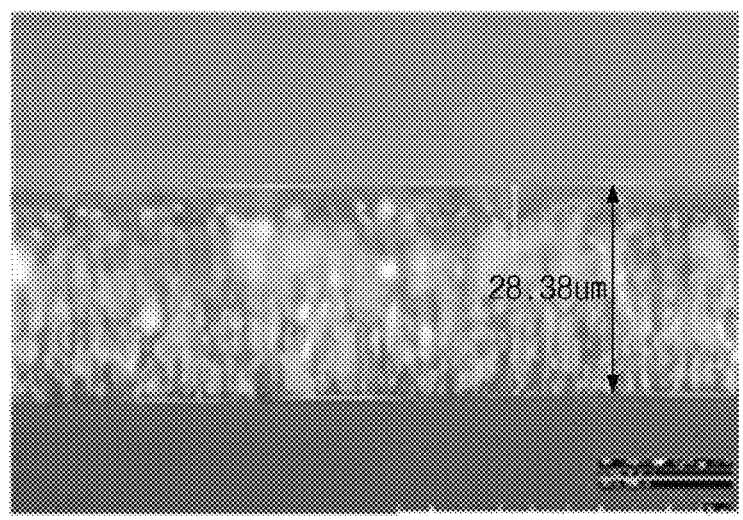

FIG. 11A shows the simulated image of the target substrate in case that the etching time is about 1 second. The image of FIG. 11A may correspond to the cross-section of the target substrate CS1 dipped in the etchant ES shown in FIG. 8B. Referring to FIG. 11A, the thickness of the target substrate may be about 30 μm, and the distance between the first beam and the second beam, which are irradiated to the target substrate, is about 5.5 μm. The distance between the end of the cut portion of the target substrate and the deformed portions at which a portions of the target substrate is recessed is about 5.5 μm, which is substantially the same as the distance between the beams irradiated to the target substrate. The depth of each of the deformed portions of the target substrate, which is recessed from the upper surface and the lower surface, is about 8.5 μm.

Figure 11B:
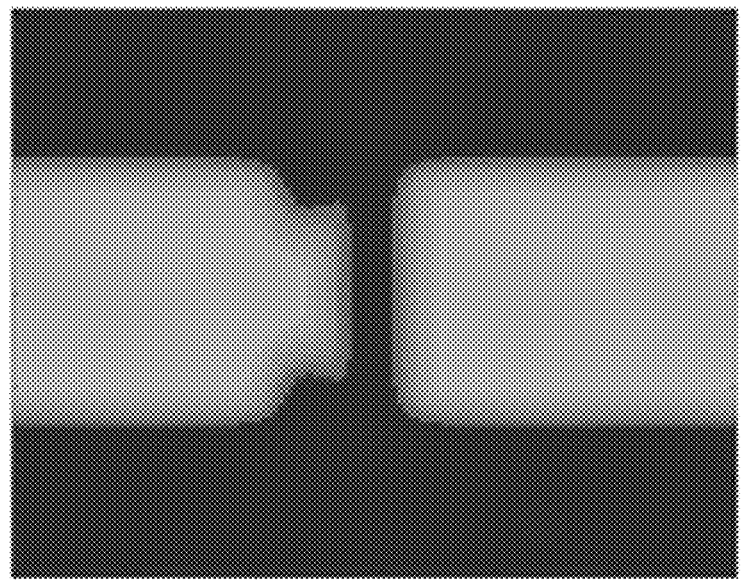
Figure 11C:
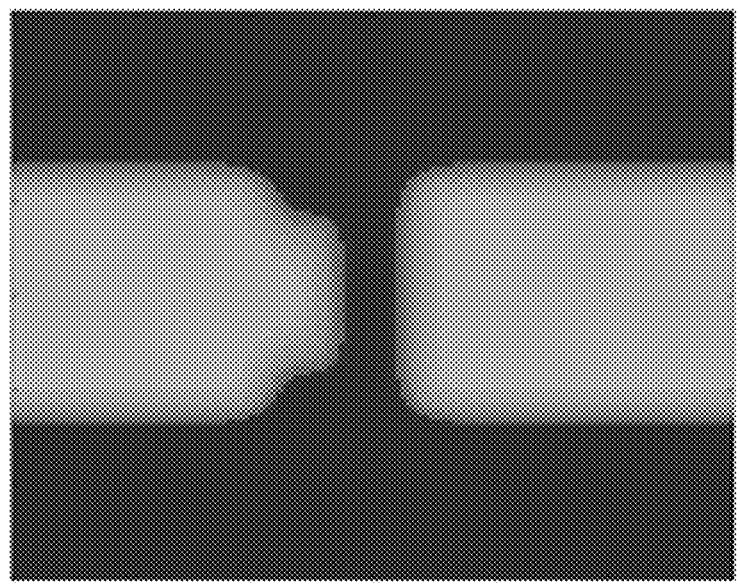
Figure 11D:
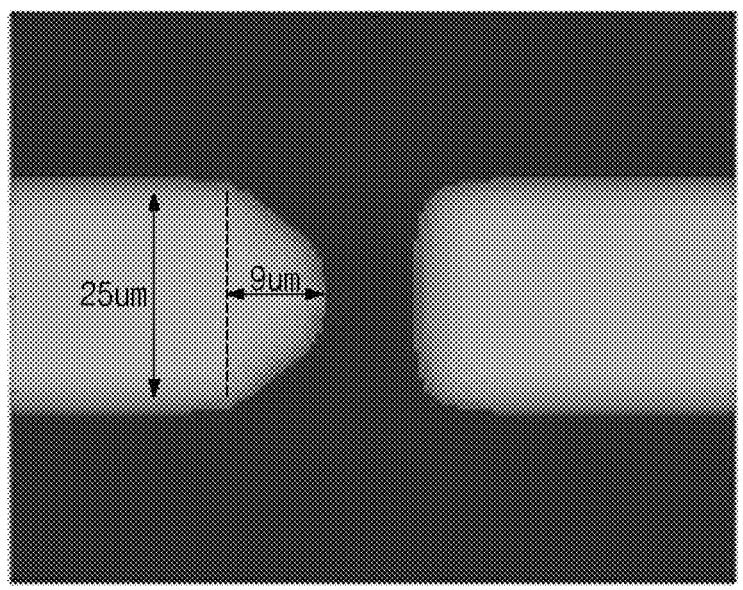

FIGS. 11B, 11C, and 11D respectively show the stimulated images of the target substrate in case that the etching time is about 60 seconds, about 74 seconds, and about 120 seconds. As the etching time increases, the etching amount of the target substrate may be changed, and the shape of the chamfered corner may be changed. Referring to FIG. 11D, the distance between the end of the chamfered target substrate and the slope surface is about 9 μm, and the thickness of the target substrate is about 25 μm. Referring to FIGS. 11B to 11D, as the etching time increases, the corner of the target substrate may be smoothly formed, and the thickness of the target substrate may be reduced. Accordingly, it is necessary to adjust the etching time within an appropriate range by taking into account the thickness and the shape of the corner of the target substrate.

FIGS. 12A to 12C are enlarged images of the target substrate manufactured by etching the mother substrate for about 120 seconds under the same condition as the above-described simulation conditions. The target substrate may be the glass substrate. FIG. 12A is an enlarged schematic cross-sectional image showing the corner of the target substrate. FIG. 12B is an enlarged schematic plane image showing the target substrate in a plan view. FIG. 12C is an enlarged schematic cross-sectional image showing the target substrate cut along the thickness direction.

The thickness of the target substrate, which is measured through the image of FIG. 12C, may be about 28.38 μm. Referring to FIGS. 12A to 12C, the target substrate formed by the window manufacturing method according to the disclosure may be formed to have the smooth corner similar to the simulated image of the target substrate of FIG. 11D, and the degree of decrease in the thickness of the target substrate may not be large. Accordingly, the window manufactured by the window manufacturing method and the window manufacturing apparatus may have improved reliability.

The window manufactured by the window manufacturing method and the window manufacturing apparatus of the disclosure may have improved reliability. The window manufacturing apparatus of the disclosure may control the phase and/or the distance of the beams using the light irradiation module. Accordingly, the window manufacturing method and the window manufacturing apparatus of the disclosure may accurately cut the mother substrate having the thin thickness and the large size and may cut the mother substrate to allow the target substrate to have the rounded corner. According to the window manufacturing method of the disclosure, the cut target substrates may be separated from the mother substrate and may be exposed to the etchant in the chamfering process, and since the area of the target substrates may be smaller or less than that of the mother substrate, the target substrate may be readily controlled for the chamfering process.

Although embodiments have been described, it is understood that the disclosure should not be limited to these embodiments but various changes and modifications can be made by one of ordinary skill in the art within the spirit and scope of the disclosure as hereinafter claimed.

Therefore, the disclosed subject matter should not be limited to any single embodiment described herein, and the scope of the disclosure shall be determined according to the attached claims.

What is claimed is:

1. A window manufacturing method comprising:
   providing a mother substrate on a moving stage, the mother substrate including a cutting line;
   irradiating substantially simultaneously a first beam and a second beam to the mother substrate to cut the mother substrate and to form a target substrate;
   separating the target substrate from the mother substrate; and
   providing an etchant to the target substrate to chamfer the target substrate, wherein
   a pulse energy of the first beam is different from a pulse energy of the second beam,
   the first beam is irradiated to the cutting line of the mother substrate, and
   the second beam is irradiated to a point spaced apart from the cutting line of the mother substrate by a distance.

2. The window manufacturing method of claim 1, wherein the distance is equal to or less than about ⅓ of a thickness of the mother substrate.

3. The window manufacturing method of claim 1, wherein each of the pulse energy of the first beam and the pulse energy of the second beam is equal to or greater than about 0.1 μJ and equal to or less than about 300 μJ.

4. The window manufacturing method of claim 1, wherein the pulse energy of the second beam is equal to or greater than about 30% of the pulse energy of the first beam and equal to or less than about 70% of the pulse energy of the first beam.

5. The window manufacturing method of claim 1, wherein at least one of the first beam and the second beam is a Bessel beam.

6. The window manufacturing method of claim 1, wherein the mother substrate has a thickness equal to or greater than about 10 μm and equal to or less than about 500 μm.

7. The window manufacturing method of claim 1, wherein
   the first beam penetrates the mother substrate to cut the mother substrate in a thickness direction of the mother substrate, and
   the second beam cuts a portion of the mother substrate in the thickness direction of the mother substrate.

8. The window manufacturing method of claim 1, wherein the first beam and the second beam are generated by a laser source.

9. The window manufacturing method of claim 8, wherein the laser source has a wavelength equal to or greater than about 250 nm and equal to or less than about 1500 nm.

10. The window manufacturing method of claim 8, wherein the laser source has a pulse duration equal to or greater than about 100 femtoseconds and equal to or less than about 10 nanoseconds.

11. The window manufacturing method of claim 8, wherein the laser source has a pulse repetition frequency equal to or greater than about 1 kHz and equal to or less than about 10 GHz.

12. The window manufacturing method of claim 1, wherein
   the providing the etchant to the target substrate comprises providing the etchant to form a surface inclined at a first angle with respect to an upper surface or a lower surface of the target substrate, and
   the first angle is equal to or greater than about 40 degrees and equal to or less than about 90 degrees.

13. The window manufacturing method of claim 1, wherein the etchant comprises at least one of a hydrofluoric acid, a hydrochloric acid, and an ammonium fluoride.

14. The window manufacturing method of claim 1, wherein the providing the etchant to the target substrate further comprises adding an organic material to the etchant to increase a viscosity of the etchant.

15. The window manufacturing method of claim 14, wherein the organic material comprises at least one of a citric acid and a sucrose.

16. The window manufacturing method of claim 1, wherein
   the cutting of the mother substrate comprises irradiating a third beam, the third beam and the second beam having a same pulse energy, the third beam being irradiated simultaneously with the first beam and the second beam, and
   a point to which the third beam is irradiated is symmetrical with the point to which the second beam is irradiated with respect to the cutting line of the mother substrate.

17. A window manufacturing apparatus comprising:
a moving stage including a mother substrate, the mother substrate including a cutting line; and
a light irradiation module disposed above the moving stage that substantially simultaneously irradiates a center beam and one or more side beams to the mother substrate, the light irradiation module comprising:
a laser source; and
a light converter splitting the laser source into the center beam and the one or more side beams, wherein
the center beam is irradiated to the cutting line of the mother substrate,
the one or more side beams is irradiated to at least one point spaced apart from the cutting line of the mother substrate by a distance, and
the one or more side beams has a pulse energy less than a pulse energy of the center beam.

18. The window manufacturing apparatus of claim 17, wherein the light converter comprises a spatial light modulator or an axicon that emits the laser source as a Bessel beam.

19. The window manufacturing apparatus of claim 17, wherein
the light converter splits the laser source into the center beam and the one or more side beams, and
the at least one point to which the one or more side beams are irradiated are symmetrical with respect to a point to which the center beam is irradiated.

20. The window manufacturing apparatus of claim 19, wherein the one or more side beams have a same pulse energy.

* * * * *